United States Patent [19]

Beauviala

[11] Patent Number: 4,744,651

[45] Date of Patent: May 17, 1988

[54] DEVICE FOR GUIDING A FILM IN A CINE CAMERA

[75] Inventor: Jean-Pierre Beauviala, Grenoble, France

[73] Assignee: Aaton RG, Grenoble, France

[21] Appl. No.: 17,270

[22] Filed: Feb. 20, 1987

[30] Foreign Application Priority Data

Feb. 24, 1986 [FR] France ............................... 86 02492

[51] Int. Cl.[4] .............................................. G03B 1/48
[52] U.S. Cl. ..................................... 352/225; 352/227
[58] Field of Search ................................. 352/225, 227

[56] References Cited

U.S. PATENT DOCUMENTS 1,350,548  8/1929  Darby ................................. 352/227
3,994,581  11/1976  Hopkins et al. .................... 352/225

FOREIGN PATENT DOCUMENTS 906783  1/1946  France ................................. 352/225

Primary Examiner—Monroe H. Hayes
Attorney, Agent, or Firm—McAulay, Fields, Fisher, Goldstein & Nissen

[57] ABSTRACT

A device for guiding a film in a cine camera comprises a channelled plate pierced with a window for filming and along the rear face of which is displaced the film. A presser member is disposed behind the film, opposite the filming window in the channelled plate, and means are provided for applying the presser member under pressure against the film and the channelled plate, when the film is stopped during filming, and for eliminating this pressure during the descending movement of the film. The means controlling the pressure exerted by the presser member on the film comprise a periodic magnetic field generator producing, during the descending movement of the film, a magnetic film acting on the presser member, made of ferromagnetic material, to eliminate the pressure of the presser member on the film during the descent thereof.

19 Claims, 2 Drawing Sheets

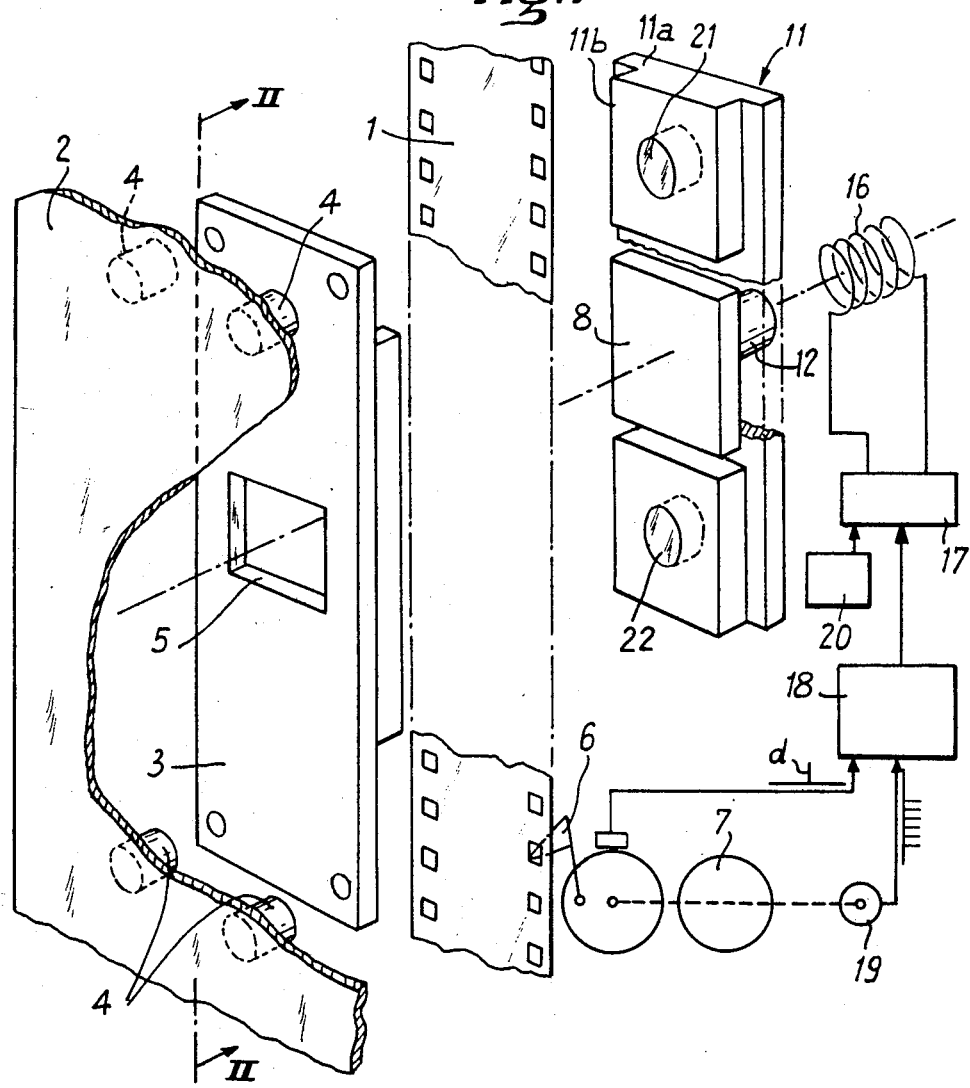
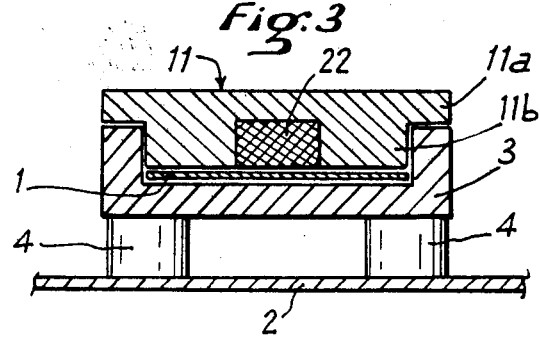

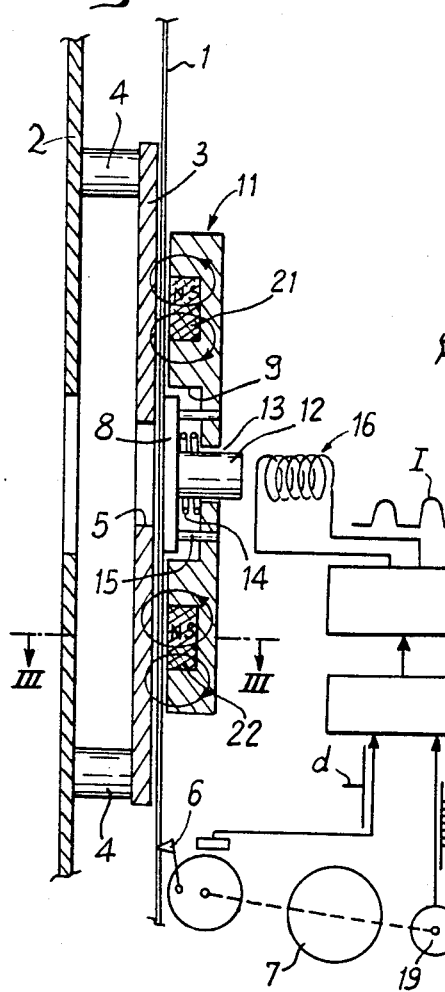
Fig:2
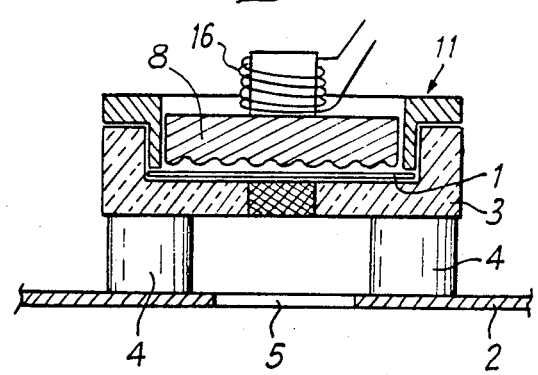
Fig:5
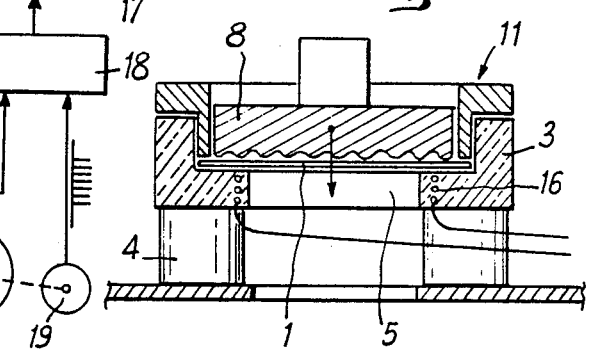
Fig:6
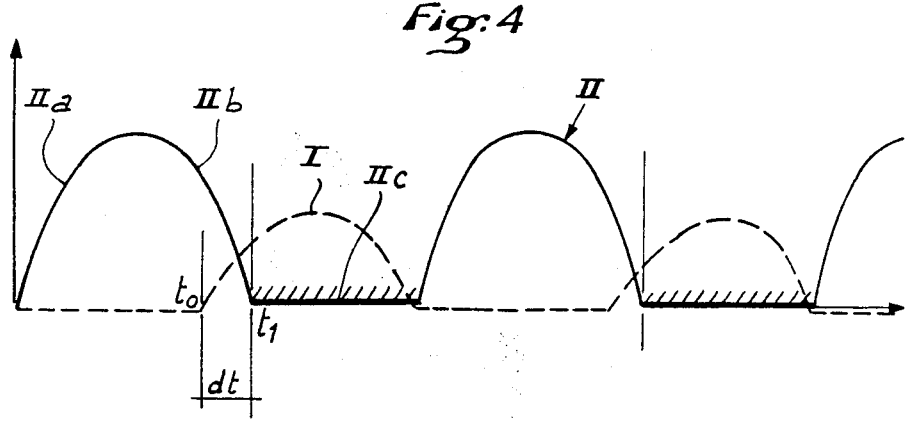
Fig:4

DEVICE FOR GUIDING A FILM IN A CINE CAMERA

BACKGROUND OF THE INVENTION

The present invention relates to a device for guiding a film in a cine camera.

In the heretofore known cine cameras, the film is displaced downwardly step by step by means of a claw animated by a reciprocating movement and which is engaged in the perforations provided in the film. The film slides vertically along the rear face of a channelled plate in which is cut out a window aligned with the lens for shooting. The device for intermittent drive of the film is arranged so as to leave the film fixed for a certain time during which an image is printed on the film, after which the film is driven downwardly by the claw of the drive device, in mesh in a perforation in the film, this claw then rising again and engaging in another perforation in order to start the filming cycle again. During filming, i.e. whilst the film is maintained immobile opposite the window of the channelled plate, this film is maintained applied on the channelled plate by a rear presser member which is mounted mobile in a support. Means such as springs are provided to exert a pressure on the presser so that the film is applied against the rear face of the channelled plate.

Means are known at present which make it possible to retract the presser member rearwardly, during the descending movement of the film, and to reapply this presser member against the film, when the latter is stopped. These means are generally constituted by noisy mechanical members which do not enable the value of the pressure exerted nor the precise instant when the pressure begins to be applied on the film, at the end of the descending stroke, to be easily adjusted.

SUMMARY OF THE INVENTION

It is an object of the present invention to overcome these drawbacks by providing a device of particularly simple design, not employing mechanical members and consequently avoiding any undesirable noise.

To this end, this device for guiding a film in a cine camera which comprises a channelled plate pierced with a window for filming and along the rear face of which is displaced the film, means for intermittently displacing the film and for maintaining it immobile during each image-taking, a presser member disposed behind the film, opposite the filming window in the channelled plate, means for applying the presser member under pressure against the film and the channelled plate, when the film is stopped during filming, and for eliminating this pressure during the descending movement of the film, these means being synchronized with the means for driving the film, is characterised in that the means controlling the pressure exerted by the presser member on the film comprise a periodic magnetic field generator producing, during the descending movement of the film, a magnetic field acting on the presser member, made of ferromagnetic material, to eliminate the pressure of the presser member on the film during the descent thereof.

The periodic magnetic field generator advantageously comprises a solenoid extending in the immediate vicinity of the presser member, substantially in the axis thereof, this solenoid being energized by a periodic electric current having the appropriate wave form for periodically eliminating the pressure exerted by the presser member on the film. The phase of the solenoid energization current may be adjusted as a function of the speed of advance of the film, so that the pressure exerted by the presser member on the film is established just before this film stops, in order to contribute to the braking thereof.

According to a further feature of the invention, the support of the rear presser member is maintained on the channelled plate by magnetic attraction obtained by means of at least one permanent magnet mounted on the channelled plate and/or on the support of the presser member. This magnetic fixation of the support of the presser member on the channelled plate makes it possible to avoid, in the case of a cine camera with interchangeable magazines, the application on the channelled plate of a force coming from the outside, which force would tend to modify the precise positioning of the channelled plate, even if this latter is mounted on acoustic insulator studs.

BRIEF DESCRIPTION OF THE DRAWINGS

The invention will be more readily understood on reading the following description with reference to the accompanying drawings, in which FIG. 1 is an exploded perspective view of a device for guiding a film in a cine camera.

FIG. 2 is a cross-sectional view taken on line II—II of FIG. 1.

FIG. 3 is a cross-sectional view taken on line III—III of FIG. 2.

FIG. 4 is a diagram illustrating the variation of the solenoid energization current as a function of the driving stroke of the film.

FIG. 5 is a horizontal transverse sectional view of a variant embodiment of the device.

FIG. 6 is a horizontal transverse sectional view of another embodiement of the device.

DESCRIPTION OF THE PREFERRED EMBODIMENTS

Referring now to the drawings, the device according to the invention shown in FIGS. 1 and 2 is intended to ensure guiding of a cine film 1 inside the body of a camera containing a vertical plate 2 on which is fixed a channelled plate 3. This channelled plate 3, of generally rectangular shape, presents, in its central part, a cross-section in the form of a rearwardly open U so as to constitute a sort of channel in which the cine film 1, which advances downwardly, slides. The channelled plate 3 is fixed on plate 2 of the body of the camera by means of acoustic insulator studs 4.

The channelled plate 3 is pierced, in its central part, with a rectangular window 5 for filming, aligned with the lens (not shown) and opposite which the film 1 is immobilised, by intermittence, during each filming phase. The intermittent downward drive movement of the film 1 is effected by means of a claw 6 engaging in the lateral perforations in the film 1 and which is displaced by an electric motor 7, via an appropriate transmission mechanism. The claw 6 is engaged in a perforation in the film 1 then it is driven downwardly, taking the film 1 along with it, after which the claw 6 is disengaged from the perforation leaving the film 1 immobile, and it rises into starting position to engage in the following perforation.

In order to maintain the cine film 1 firmly in position during each filming operation, the camera comprises, to the rear of the film 1, a presser member 8 of square or rectangular shape which is housed in a recess 9, substantially of the same shape, provided in the front face of a rear support 1. This support 11 is constituted by a small plate, generally rectangular in form, comprising a relatively wide rear base 11a and a narrower front part 11b which engages in the channel formed in the rear face of the channelled plate 3.

As may be seen in FIGS. 1 and 2, the presser member 8 is mounted to "float" in its recess 9 and it is fast with a lug 12 extending axially rearwardly and projecting outside the support 11, through an orifice 13 provided in this support. A spring 14 is disposed in the recess 9, between the presser member 8 and the bottom of recess 9, in order permanently to stress the presser member 8 rearwardly, i.e. opposite film 1. The presser member 8 is also fast with small guide rods 15 which extend rearwardly and which pass through holes made in the support 11.

According to the invention, the presser member 8 is subjected to the action of a periodic magnetic field generator 16 constituted, in the present case, by a solenoid. To this end, the presser member 8 or at least the lug 12 which is fast therewith, is made of a ferromagnetic material. The solenoid 16 is supplied with periodic electric current which varies as illustrated by the broken-line curve I in FIG. 4. This figure also shows a solid-line curve II which illustrates the downward movement of the film 1. This movement comprises an acceleration phase IIa then a deceleration phase IIb then a stop phase IIc during which the film is immobilized in front of the filming window 5.

The current energising the to solenoid 16 may have a substantially sinusoidal or truncated sinusoidal form conserving only the positive half-waves. The current I is supplied by a digital/analog converter 17 whose input is connected to the output of a counter 18 supplied with pulses by a tachometer 19 coupled to the electric motor 7. This counter 18 also receives a synchronisation pulse d emitted from the mechanism for driving the claw 6, at a rate of one synchronization pulse d per image. From the pulses furnished by the tachometer 19 and the synchronization pulse d, the counter 18 controls by its output the digital/analog converter 17 so that the latter delivers at its output a periodic analog current varying in time as represented by the curve I in FIG. 4. This current is set, with respect to the movement of the film, so that its maximum intensity corresponds to the stop phase IIc of the film. Consequently, whilst the film is stopped, the solenoid 16 produces the maximum magnetic field which has for its effect to repel the core 12 and consequently to apply the presser member 8 on the film 1, this presser member 8 being spaced apart from the film 1, under the action of the traction spring 14, in the absence of the magnetic field, i.e., for a zero current I.

The device according to the invention offers the advantage that it is possible to adjust the setting or the phase of the periodic current I with respect to the movement of the drive claw 6 illustrated by curve II. In other words, it is possible to vary the time gap dt between the moment to when the current I begins to increase, whilst the film is at the end of stroke and is in the course of deceleration, and the instant t1 when the film stops. Consequently, the pressure exerted by the presser member 8 on the film may begin to be established at the instant to, during the period of deceleration, prior to the instant t1 when the film stops, so that the current I contributes to braking the film. Braking advance dt may easily be adjusted as a function of the speed of advance of the film: it suffices consequently to control the digital/analog converter 17 from instructions and values stored in a read-only memory 20 connected to this converter 17.

The effort generated by the magnetic field created by the solenoid 16 is opposite that exerted by the spring 14 which is a traction spring in the example described.

According to a variant embodiment, the spring 14 may be a compression spring, i.e. which permanently pushes the presser member 8 towards the film 1. In that case, the solenoid 16, when it is energized, exerts an antagonistic effort of attraction on the core 12 and the presser member 8 in order to eliminate any pressure during the descending movement of the film.

The solenoid 16 may be fixed, as shown in FIGS. 1 and 2, or it may be mobile, being borne by the presser member 8, wound about the lug 12 as illustrated in FIG. 5.

In the variant embodiment of the invention shown in FIG. 6, the solenoid 16 is housed in the channelled plate 3 and it surrounds the filming window 5. In that case, when the solenoid 16 is energized, it attracts the presser member 8, during each phase of immobilization of the film. The solenoid 16 is then de-energized during the descent of the film and the presser member 8 is then spaced apart from the film 1 by a return spring or any other equivalent means. To that end, one or more magnets may be used, borne by the channelled plate 3 and repelling magnets of opposite polarity borne by the presser member 8.

Another feature of the film guiding device according to the invention is that the rear support 11 of the rear presser member 8 is fixed to the channelled plate 3 by magnetic attaction. To that end, the rear support 11 of the presser member 8 bears, for example, two permanent magnets 21 and 22 disposed respectively above and below the presser member 8, one of their polar faces being flush with the front face of the support 11. The rear support 11 and the channelled plate 3 being made of a ferromagnetic material, the magnetic field emitted by each of the magnets 21,22 closes through this plate 3 and the rear support 11, likewise in ferromagnetic material, this provoking the attraction of the support 11 against the channelled plate 3. Consequently, there is no force of application of the support 11 on the channelled plate 3 coming from the outside, which force would tend to modify the precise positioning of this channelled plate 3 mounted on the acoustic insulator studs 4.

According to a variant embodiment, the magnetic 21 and 22 may be borne by the channelled plate 3, the support 11 of the presser member being made of a ferromagnetic material.

What is claimed is:

1. A device for guiding a film in a cine camera, comprising:
    a channelled plate pierced with a window for filming, the film being displaced along the rear face of said channelled plate;
    driving means for intermittently displacing the film and for maintaining it immobile during each image-taking;
    a presser member made of ferromagnetic material disposed behind the film opposite the filming window in said channelled plate;
    means for applying said presser member under pressure against the film and said channelled plate, when the film is stopped during filming, and for eliminating this pressure during descending movement of the film, said applying means being synchronized with said driving means;

said driving means controlling the pressure exerted by said presser member onto the film and comprising a periodic magnetic field generator producing a magnetic field acting on said presser member during the descending movement of the film to eliminate the pressure of said presser member onto the film during the descent thereof;

said periodic magnetic field generator comprising a solenoid extending in the immediate vicinity of said presser member substantially along the axis thereof, and said solenoid being energized by a periodic electric current having the appropriate wave form for periodically eliminating the pressure exerted by said presser member onto the film;

a digital/analog converter for supplying the current energizing said solenoid;

a counter having an output connected to the input of said digital/analog converter;

a tachometer coupled to an electric motor controlling the intermittent movement of the film and supplying pulses to said counter; and a driving mechanism for supplying a synchronization pulse to said counter at a rate of one synchronization pulse per image, so that the digital/analog converter delivers at its output a periodic analog current varying in time.

2. A device according to claim 1, wherein means are provided for adjusting the phase of the current energising the solenoid, depending on the speed of the film, so that the pressure exerted by the presser member on the film may begin to be established prior to the instant when the film stops, so that the energising current contributes to braking the film.

3. A device according to claim 1, wherein the presser member is mounted to "float" in a recess of a rear support and it is fast with a lug extending axially rearwardly and projecting outside the rear support, through an orifice provided in this rear support, a spring is disposed in said recess, between the presser member and the bottom of said recess, and the presser member or at least the lug which is fast therewith, is made of a ferromagnetic material.

4. A device according to claim 3, wherein the spring is a traction spring and the magnetic field created when the solenoid is energized, repels the presser member in the direction of the film.

5. A device according to claim 3, wherein the spring is a compression spring and the magnetic field created when the solenoid is energized, attracts the presser member and moves it away from the film.

6. A device according to claim 3, wherein the rear support of the rear presser member is fixed to the channelled plate by magnetic attraction.

7. A device according to claim 6, wherein the rear support of the presser member or the channelled plate bears two permanent magnets disposed respectively above and below the presser member, one of their polar faces being flush with the front face of the support or the channelled plate, and the rear support and the channelled plate are made of a ferromagnetic material so that the magnetic field emitted by each of the magnets closes through this plate and the rear support likewise in ferromagnetic material, this provoking the attraction of the support against the channelled plate.

8. A device according to claim 1, wherein the presser member carries the solenoid.

9. A device according to claim 1, wherein the solenoid is housed in the channelled plate and it surrounds the filming window.

10. A device for guiding a film in a cine camera, comprising:

a channelled plate having a window for filming, the film being displaced along the rear face of said channelled plate;

driving means for intermittently displacing the film and for maintaining it immobile during each image-taking;

a presser member disposed behind the film aligned with said filming window in said channelled plate;

means for applying said presser member under pressure against the film and said channelled plate, when the film is stopped during filming, and for eliminating this pressure during descending movement of the film, said applying means being synchronized with said driving means;

said driving means controlling the pressure exerted by said presser member onto the film and comprising a periodic magnetic field generator producing a magnetic field acting on said presser member during the descending movement of the film to eliminate the pressure of said presser member onto the film during the descent thereof;

said periodic magnetic field generator comprising a solenoid extending in axial alignment with said window and said presser member substantially along the axis thereof, and said solenoid being energized by a periodic electric current having the appropriate wave form for periodically eliminating the pressure exerted by said presser member onto the film; and means for controlling the precise instant when pressure by said presser member begins to apply pressure and adjusting the phase of the current energizing said solenoid in relationship to the speed of the film, so that the pressure exerted by said presser member onto the film begins to be established prior to the instant when the film stops, so that the energizing current contributes to braking the film.

11. The device according to claim 10, wherein:

said rear support is provided with an orifice and a recess, and said presser member is mounted to float in said recess;

said presser member including a single lug fixed thereto and extending axially rearwardly thereof and projecting outside said rear support through said orifice; and a single spring disposed in said recess between said presser member and the bottom of said recess, said lug being made of a ferromagnetic material.

12. The device according to claim 11, wherein said spring is a traction spring to maintain said presser member away from the film, and the magnetic field created when said solenoid is energized repels said presser member for movement thereof in the direction of the film.

13. The device according to claim 11, wherein said spring is a compression spring and the magnetic field created when the solenoid is energized attracts said presser member and moves it away from the film.

14. The device according to claim 10, wherein said presser member carries said solenoid.

15. The device according to claim 10, including:

a digital/analog converter for supplying current to energize said solenoid;

a tachometer coupled with an electric motor;

a counter having an output connected to the input of said digital/analog converter, said tachometer supplying pulses to said counter for controlling the motor to impart the intermittent movement to the film; and a driving mechanism supplying a synchronization pulse to said counter at a rate of one synchronization pulse per image so that the digital/analog converter delivers at its output a periodic analog current varying in time so as to control the precise instant when the pressure begins to be applied.

16. The device according to claim 10, wherein the solenoid is housed in said channelled plate and surrounds said filming window.

17. The device according to claim 10, wherein said rear support is fixed to said channelled plate by magnetic attraction.

18. The device according to claim 17, wherein said rear support of said presser member and said channelled plate bears two permanent magnets disposed respectively above and below said presser member, one of their polar faces being flush with the front face of said support or said channelled plate, and said rear support and said channelled plate are made of a ferromagnetic material so that the magnetic field emitted by each of said magnets closes through this plate and the rear support likewise in ferromagnetic material, thus provoking the attraction of said support against said channelled plate.

19. A device for guiding a film in a cine camera, comprising:

a channelled plate pierced with a window for filming, the film being displaced along the rear face of said channelled plate;

driving means for intermittently displacing the film and for maintaining it immobile during each image-taking;

a single presser member disposed behind the film opposite the filming window in said channelled plate;

means for applying said single presser member under pressure in alignment with said window and against the film and said channelled plate, when the film is stopped during filming, and for eliminating this pressure during descending movement of the film, said applying means being synchronized with said driving means;

said means controlling the pressure exerted by said presser member onto the film comprises a periodic magnetic field generator producing a magnetic field acting on said presser member during the descending movement of the film to eliminate the pressure of said presser member onto the film during the descent thereof;

said periodic magnetic field generator comprising, in axial alignment with said window, a solenoid extending towards said presser member substantially along the axis thereof, and said solenoid being energized by a periodic electric current having the appropriate wave form for periodically eliminating the pressure exerted by said presser member onto the film;

means for energizing said solenoid in accordance with the intermittent movement supplied to the film by said driving means for controlling the precise instant when the pressure begins to be applied by said presser member;

a driving mechanism for supplying a synchronization pulse to said energizing means at a rate of one synchronization pulse per image, so that the energizing means delivers at its output a periodic current varying in time, whereby when said solenoid produces its maximum magnetic field when the film is stopped.

* * * * *